US006931481B2

(12) United States Patent
Montero (10) Patent No.: US 6,931,481 B2
(45) Date of Patent: Aug. 16, 2005

(54) BATTERY FIRMWARE CUSTOMER/FIELD UPDATE METHOD

(75) Inventor: Adolfo S. Montero, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 10/034,437

(22) Filed: Dec. 27, 2001

(65) Prior Publication Data

US 2003/0135705 A1 Jul. 17, 2003

(51) Int. Cl.[7] .......................... G06F 12/00; G06F 12/08
(52) U.S. Cl. .................. 711/103; 713/300; 713/340; 365/226; 365/228; 365/229
(58) Field of Search .................. 711/103, 163; 713/300, 340; 365/226, 228, 229

(56) References Cited

U.S. PATENT DOCUMENTS

2001/0011355 A1 * 8/2001 Kawai ......................... 713/202

OTHER PUBLICATIONS

Microsof Computer Dictionary, 1999, Microsoft Press, Fourth Edition, p. 84.*

Computer Networks: A Systems Approach, Larry L. Peterson and Bruce S. Davie, Published in 2000, Academic Press, Second Edition, p. 92–93.*

* cited by examiner

Primary Examiner—Pierre M Vital
Assistant Examiner—Midys Inoa
(74) Attorney, Agent, or Firm—Haynes and Boone, LLP (57) ABSTRACT

A method and system for upgrading a programmable battery unit in a mobile information handling system. The method and system make use of unique address words, checks, and comparisons stored in memory in order to allow upgrades in the battery unit. Non-reprogrammable section provides security in calculating checksums of addresses in the non-reprogrammable section and programmable section of memory.

28 Claims, 9 Drawing Sheets

BATTERY FIRMWARE CUSTOMER/FIELD UPDATE METHOD

BACKGROUND

This disclosure relates to a method and system for portable personal computer manufacturers to program, configure, and customize battery units powering portable personal computers.

Information systems in general have attained widespread use in business as well as personal computing environments. An information handling system, as referred to herein, may be defined as an instrumentality or aggregate of instrumentalities primarily designed to compute, classify, process, transmit, receive, retrieve, originate, switch, store, display, manifest, detect, record, reproduce, handle or utilize any form of information, intelligence or data for business, scientific, control or other purposes. The information handling system may be configured for a specific user application or requirement such as financial transaction processing, airline reservations, enterprise data storage and/or global communications. In general, an information handling system may include a variety of hardware and/or software components that may be configured to provide information and/or consume information. An information handling system may include one or more computer systems, data storage systems, and/or networking systems.

Included as information handling systems are portable personal computers (PCs) known commonly as laptops and notebooks; personal digital assistants (PDAs); and other mobile computing systems. These types of information handling systems rely on rechargeable battery units to provide power. Battery units can make use of various material components such as lithium ion (LION) and nickel metal hydride (NiMH). Regardless of whether a system is a PC, PDA, or other device, and regardless of the use of LION or NiMH or other material component(s), battery units must be flexible, programmable, and provide safety features. Safety features include avoiding certain over temperature and over voltage conditions. Currently, a great number of information handling systems make use of smart-batteries. Smart-batteries are battery units having separate and programmable processors.

Battery units, including smart-batteries, are volatile components that can over-charge, over-heat, and potentially explode. To prevent such catastrophic events from occurring, strict preventative measures are put in place. Such measures include limiting access to program battery units. To prevent unintentional or intentional (hacking) software changes that can lead to inappropriate or unsafe conditions, smart-batteries are exclusively programmed and modified by respective battery unit vendors.

PC manufacturers typically rely on a number of vendors to provide battery units, in particular smart-batteries. Common practice is for several vendors to supply battery units that support the same model of PC. With multiple vendors PC manufacturers are not tied to a particular supply source. Different models of PCs typically use the same generic type model battery unit; the generic type model battery unit is modified for a particular model of PC. Each model of PC has certain unique voltage, current, power, temperature sensing, and various other requirements of the battery unit. Therefore generic type battery units that are used in various models of PCs are programmed and configured to meet the specific requirements of the particular model of PC.

Battery unit vendors prior to sending battery units to the PC manufacturer program and configure battery units. Programming and configuration of battery units are conducted with specific requirements, including system interfacing required by specific models of PCs. In addition to specific PC manufacturer requirements, battery unit vendors can be required to comply with industry standard specifications that can include the system management bus (SMB) Specification that defines communication to a PC by way of an SMB. In certain cases the Smart-Battery System (SBS) Specification is applicable. The SMB was developed by the Intel® Corporation. Both the SMB Specification and the SBS Specification are maintained and controlled by the SBS Implementers Forum.

When vendors customize battery units for PC manufacturers, vendors make use of circuit mask programming, electronic erasable program read only memory (EEPROM) flash programming, and firmware programming. PC manufacturers rely on customized, properly configured battery units from vendors. In certain cases firmware in a battery requires changes or revisions. Since only battery manufacturers are able to reconfigure the battery firmware, PC manufacturers are unable to ship out PCs until properly configured batteries are made available.

PC manufacturers may at times find the need to reconfigure battery firmware in batteries that are in PCs that have been shipped and/or in use by consumers. When certain software changes are required of PC systems, a PC user (consumer) may be provided software changes on a disk or similar medium, or a PC user can download the software changes from a PC manufacturer web-site. Because of the safety restrictions that require only the battery manufacturer to perform battery firmware changes, PC users must send their batteries back to either to the PC manufacturer or battery manufacturer. If the battery is sent to the PC manufacturer, the PC manufacturer must either send a properly configured replacement battery or send the existing battery to the battery vendor for firmware changes. If a battery vendor does not have adequate stocks of the required battery units, the PC user either must delay the PC system modification or wait indefinitely until a replacement battery unit is shipped by the battery unit vendor.

Stocks of generic battery units or battery units specific to particular models of PCs must be programmed or reprogrammed, and configured by the battery unit vendor. In certain cases, cost constraints prevent vendors from performing required changes to battery units. Programming or reprogramming, and configuration a certain lot size of battery units can also be cost prohibitive to a battery unit vendor. Costs include tooling, setup, creating code, and physically receiving battery units and configuring them. When a PC system is modified, affecting the battery unit, the PC manufacturer is in the best position to modify the battery unit; however, because of safety measures the PC manufacturer is unable to make or provide the required changes to the PC user, nor can the PC manufacturer perform the required modifications.

SUMMARY

In an embodiment of the disclosure, memory in a battery unit is modified by assigning a predetermined data word to an available address in memory. Based on this address word and checksum routines on memory registers, inadvertent or malicious modifications are prevented. Data is received and processed through a non-programmable portion of the memory, which in turn passes changes to programmable section in memory.

In other embodiments, a multiplexor receives the data and processes the data along with a control signal. The control signal provides additional security in transferring data to the programmable section of the memory.

In certain other embodiments, the use of added security measures is provided, where modification of the programmable section of the memory is not performed nor is data made available if the security measure or measures are not met. Security measures include encryption and decryption of data.

In other embodiments, the system management bus (SMB) is used to transmit data. In mobile information handling devices such as a personal computer, existing SMBs are used to transmit data.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings. The use of the same reference number throughout the figures designates a like or similar element.

While the disclosure is susceptible to various modifications and alternative forms, specific embodiments thereof are shown by way of example in the drawings and will herein be described in detail, it should be understood, however, that the drawings and detailed description thereto are not intended to limit the disclosure to the particular form disclosed but on the contrary, the intention is to cover all modifications, equivalents, and alternatives falling within the spirit and scope of the present disclosure as defined by the appended claims.

DETAILED DESCRIPTION

The following is intended to provide a detailed description of an example of the disclosure and should not be taken to be limiting of the disclosure itself. Rather, any number of variations may fall within the scope of the disclosure which is defined in the claims following the description.

Introduction

The present disclosure provides a method and apparatus for modifying the firmware of a battery unit that provides power to a mobile information handling device such as a PC. Updates are provided through an existing SMB. A firmware hub in the PC system assures a level of software programming security. Additional software security is provided by a multiplexor in the battery unit that receives a control signal in order for the battery unit to be updated.

Battery Unit to PC System Connection

Figure 1:
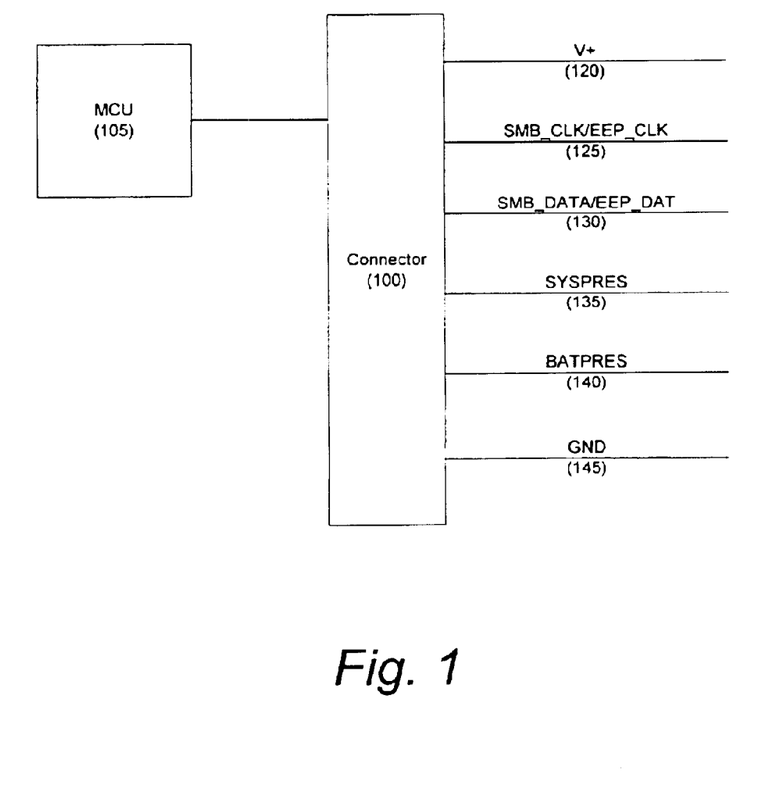
FIG. 1 is a block diagram illustrating certain battery signal connections.

Referring now to FIG. 1, a block diagram illustrates certain battery connections. Connector 100 transmits and receives certain signals to and from a PC system. Battery unit power and voltage is provided to the PC system through connector 100. Battery units are intelligent component devices and can include a management control unit (MCU) 105. MCU 105 acts as battery unit control and provides limited battery unit intelligence. MCU 105 directly interfaces to connector 100, and communicates through connector 100 to the PC system.

Along with a supplied voltage V+120 that is sent to the PC, various other control signals are sent and received through connector 100. Control signals include SMB_CLK/EEP_CLK 125 which provides timing along the system management bus; SMB_DAT/EEP_DAT 130 which provides data and information to the battery along the system management bus; SYSPRES 135 which indicates the activity of the PC system to the battery unit; and BATPRES 140 which indicates battery presence to the PC system. Connector 100 further has a pin GND 145 to common ground. Other signals can be added and provided through connector 100 as needed or required by battery unit or PC system.

Figure 2:
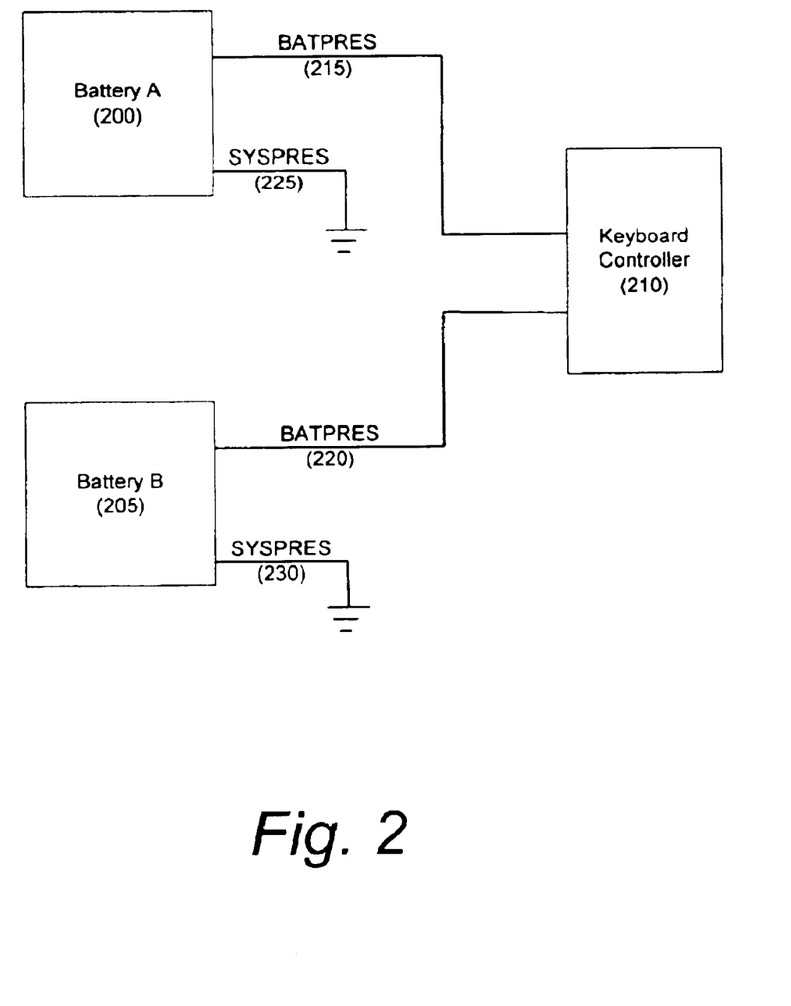
FIG. 2 is a block diagram illustrating connection of batteries to a personal computer keyboard controller.

Referring now to FIG. 2, a block diagram illustrates connection of batteries to a personal computer keyboard controller. Battery units can include pairs of batteries. In this example, battery A 200 and battery B 205 are part of a battery unit system. Pairs of batteries allow for one battery to provide power to the PC system while the other battery recharges. Keyboard controller 210 performs direct communication to battery unit from PC system. Keyboard controller 210 determines which of batteries A 200 or B 210 provides present power to the system. Signal BATPRES 215 informs keyboard controller 210 as to activation status of battery A 200. Signal BATPRES 220 informs keyboard controller 210 as to activation status of battery B 205. Through keyboard controller 210, a PC user is able to have limited control over the battery unit. For certain applications, the PC user can switch between battery A 200 and battery B 205. In other applications, the PC user is able to directly turn off the battery unit through keyboard controller 210. SYSPRES 225 signal indicates to battery A 200 of battery presence, SYSPRES 230 signal indicates to battery B 205 of battery presence.

Figure 3:
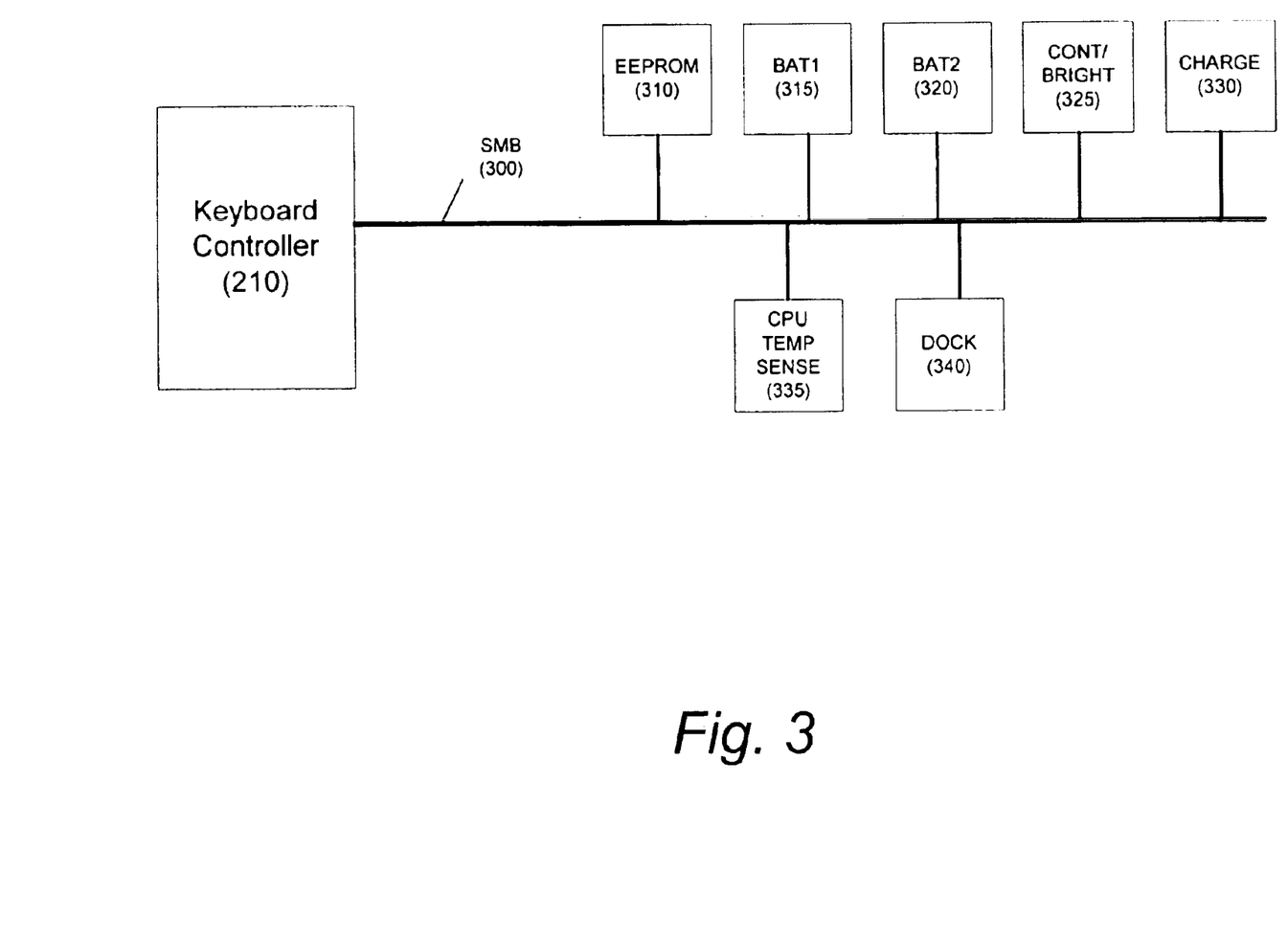
FIG. 3 is a block diagram illustrating certain device interfacing by a system management bus to a personal computer keyboard controller.

Referring now to FIG. 3, a block diagram illustrates certain device interface by a system management bus to a personal computer keyboard controller. Keyboard controller 210 transmits a signal SMB 300 to various devices and registers of devices. A single SMB or a number of SMBs can be used. A typical application is to provide a single SMB bus such as SMB 300 which includes data and clock signals.

Devices or device registers that receive SMB_DATA 300 include electronic erasable programmable read-only memory (EEPROM) 310 where EEPROM 310 is part of a battery unit; batteries BAT1 315 and BAT2 320; and CHARGE 330 indicating charging of the batter units. Other devices or device registers receiving SMB_DATA 300 relate to computer system communication and include CONT/BRIGHT 325, CPU TEMP SENSE 335, and DOCK 340.

Battery Unit Update

Figure 4:
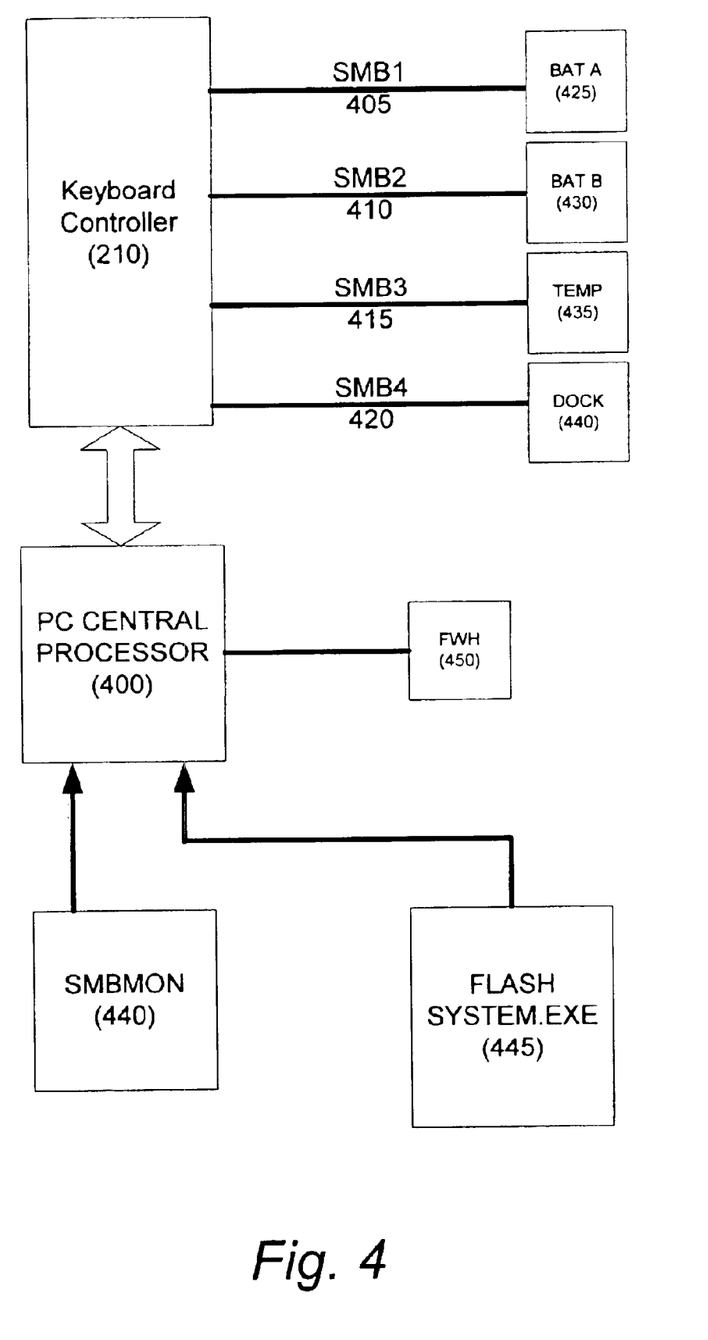
FIG. 4 is a block diagram illustrating battery configuration changes through a personal computer's central processor.

Referring now to FIG. 4, a block diagram illustrates battery configuration changes through a personal computer's central processor. Keyboard controller 210 communicates to PC system central processing unit (CPU) 400. CPU 400 can be one of various processing units sold by the Intel Corporation, Advance Micro Devices Corporation, and various other PC chip manufacturers.

In this particular embodiment, keyboard controller 210 has several SMB busses: SMB1 405, SMB2 410, SMB3 415, and SMB4 420. SMB1 405 links keyboard controller 210 to BAT A 425. SMB2 410 links keyboard controller 210 to BAT B 430. SMB3 415 links keyboard controller 210 to TEMP 435. SMB4 420 links keyboard controller 210 to DOCK 440. In other embodiments a single SMB is used to communicate signals. Keyboard controller is able to check presence of battery A by signal BAT A 425; and presence of battery B by signal BAT B 430. In addition to the described signals, the battery unit, keyboard controller and PC system can implement other signals.

SMBMON 440 is a monitor that checks basic input output system (BIOS) configuration of the PC system by communicating with CPU 400. In determining whether the battery unit is to be updated (revised) with new firmware, SMBMON 440 communicates with CPU 400 providing information as to particular version of battery unit currently docked to the PC system.

FLASH SYSTEM.EXE 445 is code that is used to provide updated battery configuration by way of CPU 400. Firmware hub (FWH) 450 communicates to CPU 400. FWH 450 provides an enhanced security platform that allows developers control and protection regarding firmware downloads. FWH 450 can include firmware hubs such as the Intel Corporation model 82802AB/AC. In this embodiment, battery configuration information is downloaded from PC system to battery unit. FLASH SYSTEM.EXE 445 can only be downloaded from CPU 400 to keyboard controller 210 if FWH 450 allows such action.

Data Communication to Battery Unit

Figure 5A:
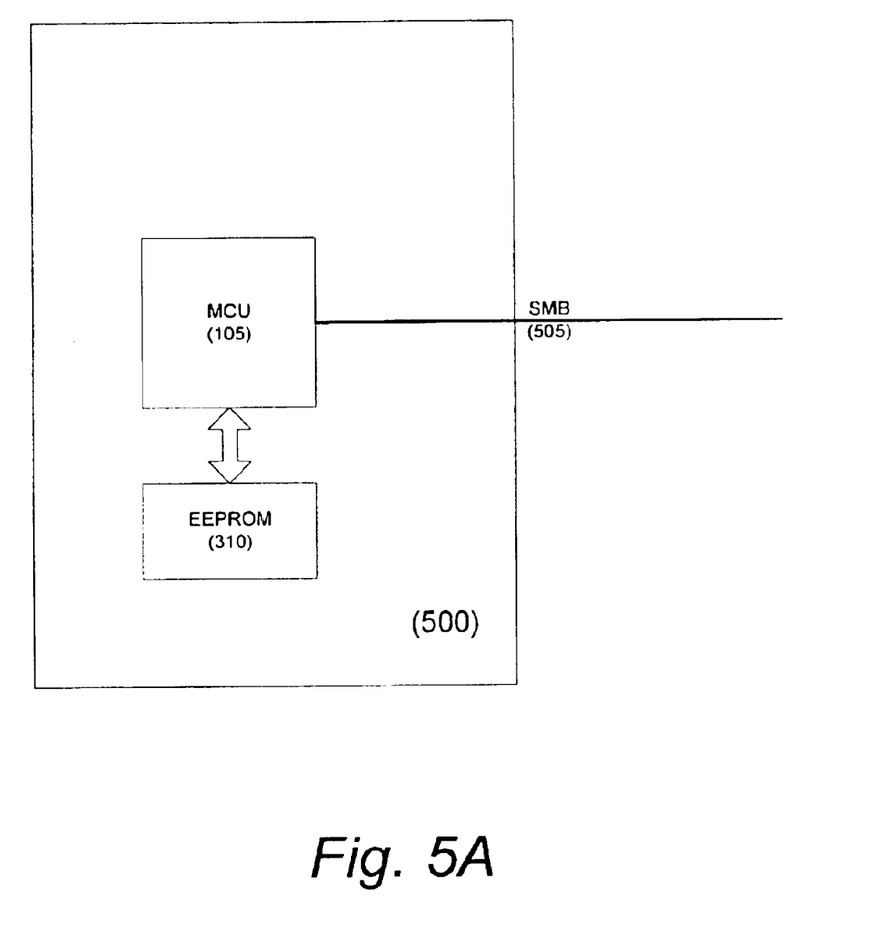
FIG. 5A is a block diagram illustrating direct firmware updates to battery unit.

Referring now to FIG. 5A, a block diagram illustrates direct firmware updates to a battery unit. In this particular embodiment, battery unit 500 receives SMB bus 505. SMB bus 505 is connected to an information handling system in which battery unit 500 powers. SMB bus 505 connects directly to MCU 105. EEPROM 310 is coupled directly and communicates bi-directionally with MCU 105. Instructions stored in EEPROM 310 provide MCU 105 the ability to control battery unit 500. SMB bus 505 includes SMB downloadable data to EEPROM 310. SMB bus 505 includes data and clock signals. The SMB Specification provides for separate data and clock signals in the data link layer when data is transferred along the SMB.

Figure 5B:
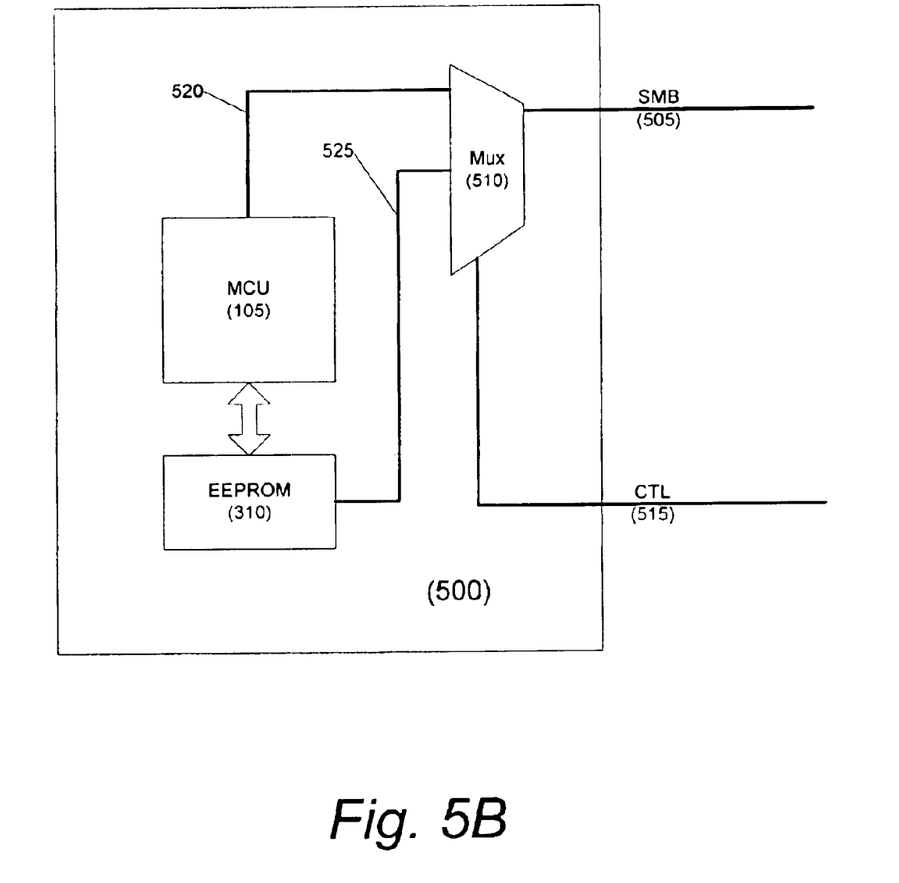
FIG. 5B is a block diagram illustrating firmware updates to a battery unit using multiplexed communication.

Referring now to FIG. 5B, a block diagram illustrates firmware updates to a battery unit using multiplexed communication. In this particular embodiment of the invention, a multixplexor (mux) 510 receives SMB bus 505. Mux 510 is part of battery unit 500. Mux 510 also receives a separate control (CTL) signal 515.

To assure that inadvertent updates are not processed, multiplexor (mux) 510 receives update information from SMB bus 505, and only passes information when signal CTL 515 is properly received. CTL 515 can be passed along by the PC system, typically through a connector. Alternatively, CTL 515 is passed by an external source from the PC system. The external source can be a specific device used by the PC manufacturer when configuring battery units prior to shipping PCs to market.

Figure 6:
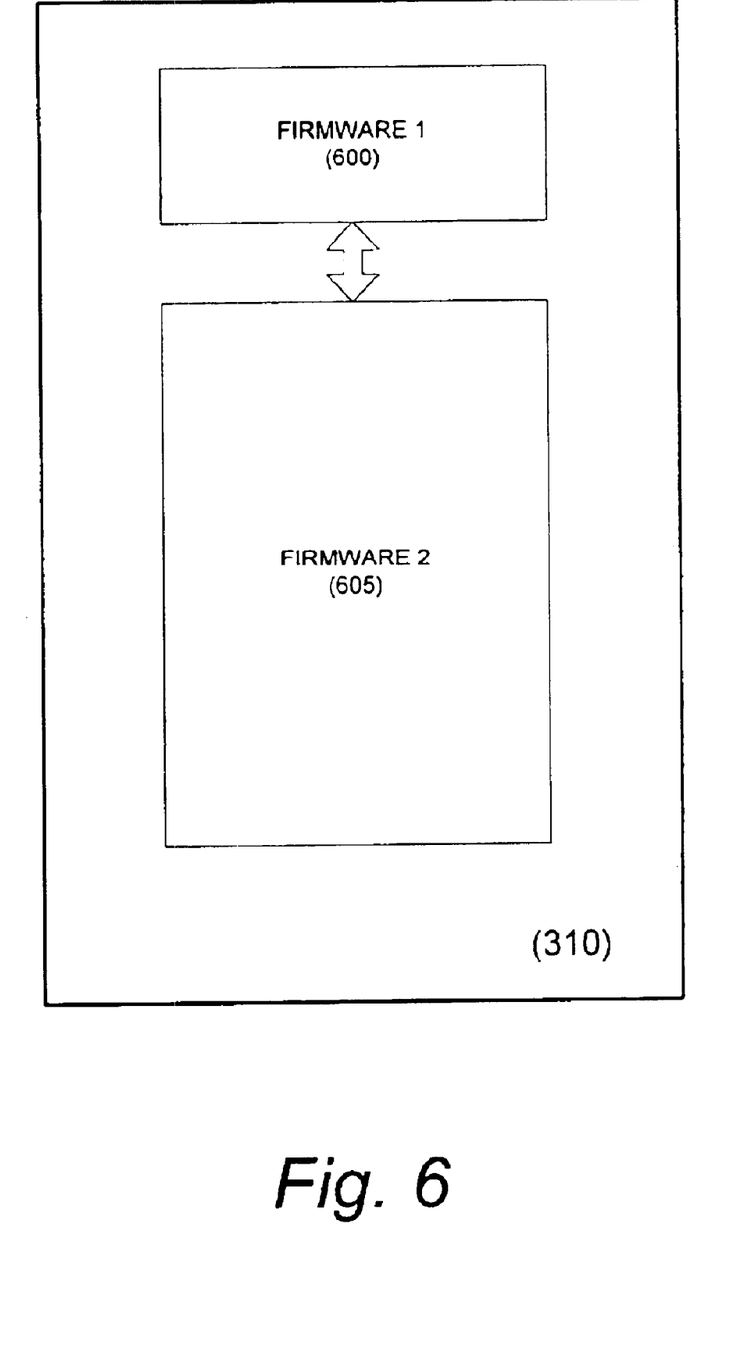
FIG. 6 is a block diagram illustrating the architecture of a battery unit memory.

Referring now to FIG. 6 a block diagram illustrates the architecture of a battery unit memory. In particular embodiments, EEPROM 310 or a similar memory device includes two separate firmware memory sections. In this example EEPROM 310 includes firmware 1 600 and firmware 2. In this particular embodiment, firmware 1 600 is a section of non-reprogrammable memory. Firmware 1 600 is directly connected to MCU 105 wherein MCU 105 is connected to an SMB bus. In other embodiments, firmware 1 600 connects to multiplexed bus 525 as illustrated in FIG. 5B.

In particular embodiments firmware 1 600 includes a boot block program. A boot block program is fixed program that is loaded when battery unit 500 is activated. The boot block program controls the loading of subsequent programs, in particular the loading of any firmware upgrades.

Firmware 1 600 may be hard-coded prior to battery unit release to the PC manufacturer. Once firmware 1 600 is hard-coded, firmware 1 600 cannot be reprogrammed. Along with the boot block program, registers within firmware 1 600 may contain the necessary checksum words that will prevent or allow firmware upgrades to firmware 2 605. Therefore, upgrade determination and actual firmware modifications are performed on firmware 2 605 only when proper boot block program requirements are met and/or checksums of registers within firmware 1 600 and firmware 2 605 are proper.

Upgrade to Battery Firmware

Figure 7:
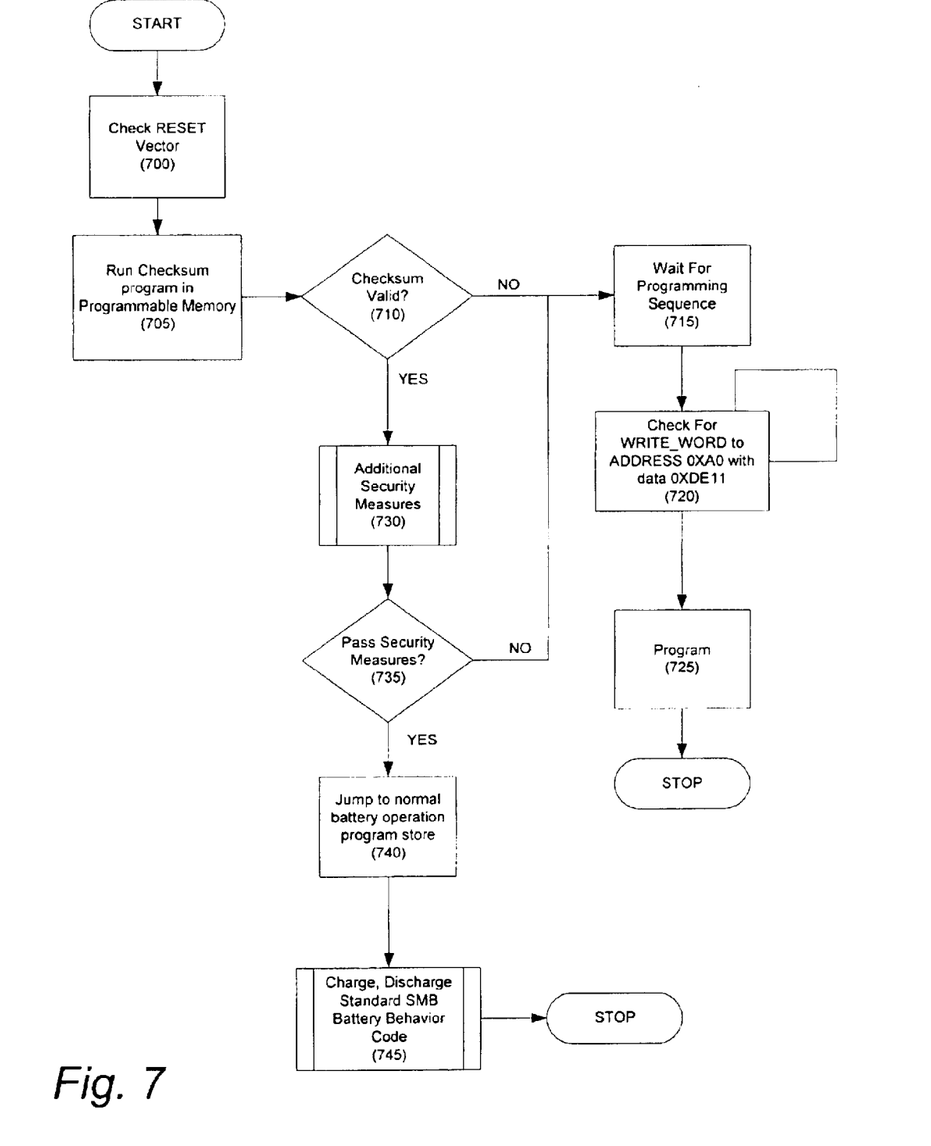
FIG. 7 is a flow chart illustrating the process of updates to battery firmware.

Referring now to FIG. 7 a flow chart illustrates the process of updates to battery firmware. In this particular embodiment, the boot block program of firmware 1 600 of FIG. 6 is described, along with interface to sections within firmware 2 605 of FIG. 6.

The boot block program initially checks a RESET vector, process 700. The RESET vector is directed to the battery unit. A checksum program located in firmware 1 600 is performed, process 705. A determination is made as to whether the checksum is valid, process 705. If the checksum is not valid, programming sequence is waited on, process 715. The programming sequence is downloaded SMB data that initiates a reconfiguration of battery firmware, in particular firmware 2 605 of FIG. 6.

The SMB Specification defines bus protocols. In particular, protocol "write byte/word" is used for writing data from the SMB. The protocol may also be referred to as command "WRITE_WORD." In the SBS Specification a battery register set is provided for. Table 1 that follows illustrates the defined battery register set.

TABLE 1

0x16: BATTERY REGISTERS

| REGISTER NAME | INDEX |
| --- | --- |
| ManufacturerAccess | 0x00 |
| RemainingCapacityAlarm | 0x01 |
| RemainingTimeAlarm | 0x02 |
| BatteryMode | 0x03 |
| AtRate | 0x04 |
| AtRateTimeToFull | 0x05 |
| AtRateTimeToEmpty | 0x06 |
| AtRateOK | 0x07 |
| Temperature | 0x08 |
| Voltage | 0x09 |
| Current | 0x0a |
| AverageCurrent | 0x0b |
| MaxError | 0x0c |
| RelativeStateOfCharge | 0x0d |
| AbsoluteStateOfCharge | 0x0e |

TABLE 1-continued

0x16: BATTERY REGISTERS

| REGISTER NAME | INDEX |
| --- | --- |
| RemainingCapacity | 0x0f |
| FullChargeCapacity | 0x10 |
| RunTimeToEmpty | 0x11 |
| AverageTimeToEmpty | 0x12 |
| AverageTimeToFull | 0x13 |
| BatteryStatus | 0x16 |
| CycleCount | 0x17 |
| DesignCapacity | 0x18 |
| DesignVoltage | 0x19 |
| SpecificationInfo | 0x1a |
| ManufactureDate | 0x1b |
| SerialNumber | 0x1c |
| ManufacturerName | 0x20 |
| DeviceName | 0x21 |
| DeviceChemistry | 0x22 |
| ManufacturerData | 0x23 |

The hexadecimal addresses are reserved in the register set up to "0X23." Subsequent register numbers; however can be used by a PC manufacturer. In this particular embodiment of the invention an available address such as "0XA0" is used in order to write data from the SMB. WRITE_WORD command is provided data such as "0XDE11" to check against address "0XA0," process 720. Process 720 continues or loops back until the address condition is met. When the address condition is met, programming (reprogramming) of firmware 2 605 is performed, process 725.

In the boot block program, if the checksum program is valid, additional security measures may be checked, process 730. Additional security measures in place may include decryption/encryption routines. A determination is made if the additional security measures are met, process 735. If the added security measures are not met, the program goes to process 715. If the added security measures are met, a transfer of program routine or jump is made to normal program operation, process 740. Normal battery operation is stored in programmable firmware 2 605. In firmware 2 605, battery operation includes operations such as battery behavior code related to charging and discharging the battery unit.

An Example Computing Environment

Figure 8:
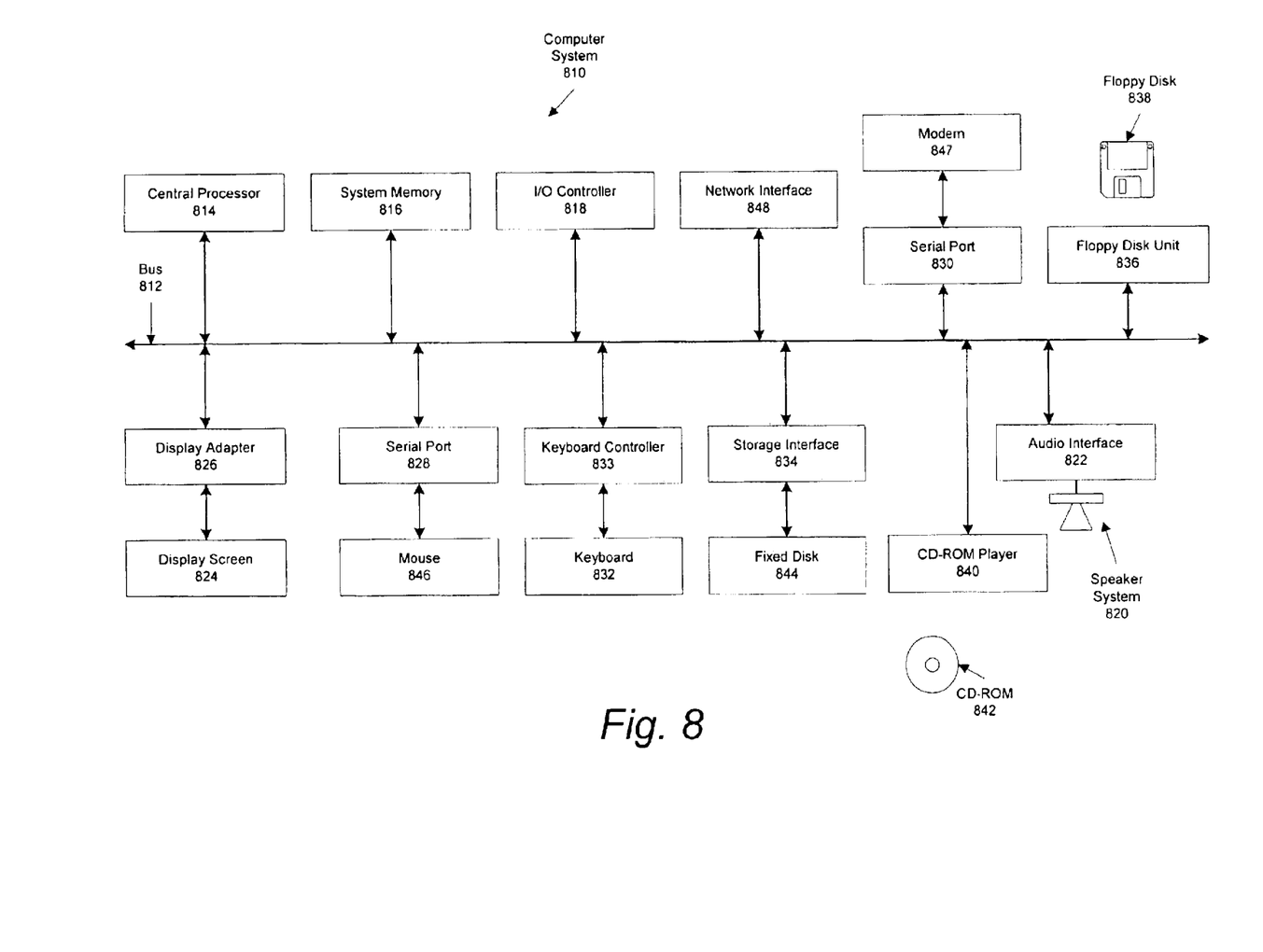
FIG. 8 is a block diagram illustrating a computer system suitable for implementing embodiments of the present disclosure.

FIG. 8 depicts a block diagram of a computer system 810 suitable for implementing the present disclosure, and example of one or more of client computers 820(1)–(N). Computer system 810 includes a bus 812 which interconnects major subsystems of computer system 810 such as a central processor 814, a system memory 816 (typically RAM, but which may also include ROM, flash M, or the like), an input/output controller 818, an external audio device such as a speaker system 820 via an audio output interface 822, an external device such as a display screen 824 via display adapter 826, serial ports 828 and 830, a keyboard 832 (interfaced with a keyboard controller 833), a storage interface 834, a floppy disk drive 836 operative to receive a floppy disk 838, and a CD-ROM drive 840 operative to receive a CD-ROM 842. Also included are a mouse 846 (or other point-and-click device, coupled to bus 812 via serial port 828), a modem 847 (coupled to bus 812 via serial port 830) and a network interface 848 (coupled directly to bus 812).

Bus 812 allows data communication between central processor 814 and system memory 816, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., CD-ROM drive 840), floppy disk unit 836 or other storage medium. Additionally, applications may be in the form of electronic signals modulated in accordance with the application and data communication technology when accessed via network modem 847 or interface 848.

Storage interface 834, as with the other storage interfaces of computer system 810, may connect to a standard computer readable medium for storage and/or retrieval of information, such as a fixed disk drive 844. Fixed disk drive 844 may be a part of computer system 810 or may be separate and accessed through other interface systems. Many other devices can be connected such as a mouse 846 connected to bus 812 via serial port 828, a modem 847 connected to bus 812 via serial port 830 and a network interface 848 connected directly to bus 812. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 8 to be present to practice the present invention. The devices and subsystems may be interconnected in different ways from that shown in FIG. 8. The operation of a computer system such as that shown in FIG. 8 is readily known in the art and is not discussed in detail in this application. Code to implement the present invention may be stored in computer-readable storage media such as one or more of system memory 816, fixed disk 844, CD-ROM 842, or floppy disk 838. Additionally, computer system 810 may be any kind of computing device, and so includes personal data assistants (PDAs), network appliance, X-window terminal or other such computing device. The operating system provided on computer system 810 may be MS-DOS®, MS-WINDOWS®, OS/2®, UNIX®, Linux® or other known operating system. Computer system 810 also supports a number of Internet access tools, including, for example, an HTTP-compliant web browser having a JavaScript interpreter, such as Netscape Navigator® 8.0, Microsoft Explorer® 8.0 and the like.

Moreover, regarding the signals described herein, those skilled in the art will recognize that a signal may be directly transmitted from a first block to second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 810). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Although the present disclosure has been described in connection with several embodiments, the disclosure is not intended to be limited to the specific forms set forth herein, but on the contrary, it is intended to cover such alternatives, modifications, and equivalents as can be reasonably included within the spirit and scope of the disclosure as defined by the appended claims.

What is claimed is:

1. A method of modifying a memory in a battery unit of a mobile information handling device comprising:
    assigning a predetermined data word to an available address in memory;
    receiving data in a non-reprogrammable section of the memory;
    modifying a programmable section of the memory if the received data complies with the predetermined data word; and
    performing a checksum of registers in the memory, whereby the foregoing is accomplished by:
      providing a processor;
      interfacing a controller between the processor and the battery unit for checking battery unit presence;
      coupling a monitor to the processor to determine the battery unit updating requirements; and
      coupling a flash device to the processor for providing an updated battery unit configuration;
    the battery unit including a first and a second battery, the first battery providing power to the device while the second battery recharges; and
    a keyboard controller coupled to the device to determine which battery provides the power.

2. The method of modifying a memory in a battery unit of a mobile information handling device of claim 1 further comprising:
    multiplexing the received data with a control signal before the non-programmable section of the memory receives the data.

3. The method of modifying a memory in a battery unit of a mobile information handling device of claim 2 further comprising:
    performing additional security measures prior to modifying the programmable section of the memory.

4. The method of modifying a memory in a battery unit of a mobile information handling device of claim 2 further comprising:
    controlling sent data from a firmware control hub in the mobile information handling device.

5. The method of modifying a memory in a battery unit of a mobile information handling device of claim 4 wherein data is transmitted along a system management bus.

6. The method of modifying a memory in a battery unit of a mobile information handling device of claim 2 wherein data is transmitted along a system management bus.

7. The method of modifying a memory in a battery unit of a mobile information handling device of claim 3 wherein data is transmitted along a system management bus.

8. The method of modifying a memory in a battery unit of a mobile information handling device of claim 1 further comprising:
    performing additional security measures prior to modifying the programmable section of the memory.

9. The method of modifying a memory in a battery unit of a mobile information handling device of claim 8 further comprising:
    controlling sent data from a firmware control hub in the mobile information handling device.

10. The method of modifying a memory in a battery unit of a mobile information handling device of claim 9 wherein data is transmitted along a system management bus.

11. The method of modifying a memory in a battery unit of a mobile information handling device of claim 8 wherein data is transmitted along a system management bus.

12. The method of modifying a memory in a battery unit of a mobile information handling device of claim 1 further comprising:
    controlling sent data from a firmware control hub in the mobile information handling device.

13. The method of modifying a memory in a battery unit of a mobile information handling device of claim 12 wherein data is transmitted along a system management bus.

14. The method of modifying a memory in a battery unit of a mobile information handling device of claim 1 wherein data is transmitted along a system management bus.

15. A mobile information handling device wherein a memory in a battery unit powering the mobile information handling device is reprogrammed comprising:
    a processor;
    a computer readable medium coupled to the processor; and
    computer code, encoded in the computer readable medium configured to cause the processor to:
      assign a predetermined data word to an available address in memory;
      receive data in a non-reprogrammable section of the memory;
      modify a programmable section of the memory if the received data complies with the predetermined data word; and
      perform a checksum of registers in the memory, wherein the information handling device includes:
        a monitor coupled to the processor to determine the battery unit updating requirements; and
        a flash device coupled to the processor to provide an updated battery unit configuration;
    the battery unit including a first and a second battery, the first battery providing power to the device while the second battery recharges; and a keyboard controller coupled to the device to determine which battery provides the power.

16. The mobile information handling device of claim 15 wherein the processor further:

multiplexes the received data with a control signal before the non-programmable section of the memory receives the data.

17. The mobile information handling device of claim 16 wherein the processor further:

performs additional security measures prior to modifying the programmable section of the memory.

18. The mobile information handling device of claim 17 wherein a firmware control hub in the mobile information handling device controls sent data.

19. The mobile information handling device of claim 18 wherein data is transmitted along a system management bus.

20. The mobile information handling device of claim 16 wherein a firmware control hub in the mobile information handling device controls sent data.

21. The mobile information handling device of claim 20 wherein data is transmitted along a system management bus.

22. The mobile information handling device of claim 16 wherein data is transmitted along a system management bus.

23. The mobile information handling device of claim 17 wherein data is transmitted along a system management bus.

24. The mobile information handling device of claim 15 wherein the processor further:

performs additional security measures prior to modifying the programmable section of the memory.

25. The mobile information handling device of claim 24 wherein a firmware control hub in the mobile information handling device controls sent data.

26. The mobile information handling device of claim 25 wherein data is transmitted along a system management bus.

27. The mobile information handling device of claim 24 wherein data is transmitted along a system management bus.

28. The mobile information handling device of claim 15 wherein data is transmitted along a system management bus.

* * * * *